J. E. ROBINSON.
NUT LOCK.
APPLICATION FILED MAR. 9, 1907.
972,924.
Patented Oct. 18, 1910.
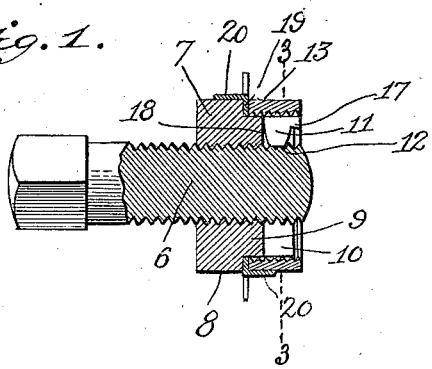
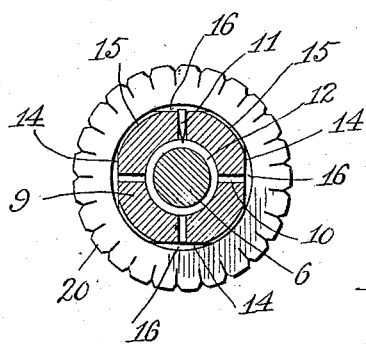
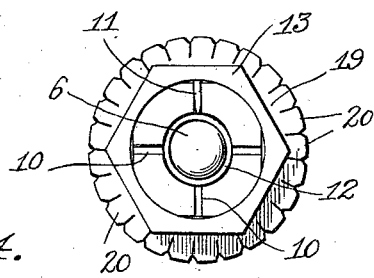
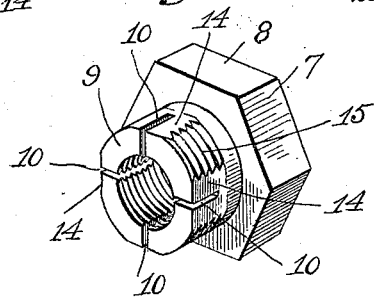
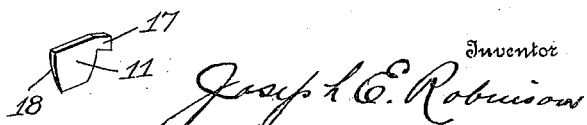
Witnesses
Edwin L. Jewell
C. F. Watson
Inventor
Joseph E. Robinson
By Hugh M. Stoning
Attorney

UNITED STATES PATENT OFFICE.

JOSEPH E. ROBINSON, OF WHEELING, WEST VIRGINIA.

NUT-LOCK.

972,924.  Specification of Letters Patent.  Patented Oct. 18, 1910.

Application filed March 9, 1907. Serial No. 361,567.

*To all whom it may concern:*

Be it known that I, JOSEPH E. ROBINSON, a citizen of the United States, residing at Wheeling, in the county of Ohio and State of West Virginia, have invented certain new and useful Improvements in Nut-Locks, of which the following is a specification.

The object of this invention is to provide a nut with a simple and effective means for locking the same upon its bolt without requiring any special construction of the bolt or any objectionable mutilation thereof by the locking means, and at the same time be readily applied and removed, and capable of effectively locking the nut at any point to which it may be adjusted.

The invention consists in providing the nut with an exteriorly threaded portion having one or more slots in said portion about which the threads have been oblivated inserting in one of said slots a blade adapted to be driven slightly into one or more of the bolt threads and retaining the same in place by a threaded collar or cap screwed upon the threaded portion of the nut.

The invention further consists in certain other novel features in the arrangement and construction of parts, as hereinafter described, and specifically set forth in the appended claims.

In the accompanying drawings, Figure 1. is a longitudinal section view of the bolt and nut in applied position; Fig. 2. is an end view of the nut and bolt; Fig. 3. is a view in transverse section taken on the line 3—3 of Fig. 1, and from which the blade retaining collar is omitted. Fig. 4. is a perspective view of the nut proper, and Fig. 5 a perspective view of the locking blade.

Referring to the drawing 6 designates a screw threaded bolt and 7 a threaded nut therefor. This nut comprises an angular turning head 8 and a cylindrical reduced portion 9 that is provided, preferably, with four slots 10 which extend from the outer to the inner surface of the reduced portion and to the outer end thereof, and are adapted to receive a blade 11 which will be inserted in the slot most conveniently positioned for that purpose in the adjustment of the nut, so that by a slight blow of a hammer on the top of the blade it will be driven down, cutting slightly one or more threads 12 of the bolt and without appreciable mutilation of the threads.

The blade receiving portion of the nut is exteriorly screw threaded to receive a threaded ring or collar 13 which is applied to retain the blade in its thread engaging position, and the exterior surface of the portion 9 is so formed as to provide a flat face 14 at the intersection of each slot with the outer surface. This construction confines the screw threads 15 to the curved surfaces of this portion and leaves a space 16 between the faces 14 and the threaded interior of the retaining ring, which admits of the slight projection of the locking blade above the face 14 to come into bearing contact with the threads of the retaining ring. By reason of the obliteration of a section of the threads 15 at each slot the locking blade can be driven into its locking position without danger of mutilation of the threads.

The blade 11 is formed with its sides tapering from the top thereof so as to be free from contact with the parallel walls of the slot except at or near the top thereof and thus obviate the liability of rust to cause the blade to become difficult of removal.

The outer end of the locking blade is provided with a projection 17, which, when the blade is inserted, extends slightly beyond the end face of the nut and affords the means for the ready removal of the blade. In order to further facilitate the removal of the blade the rear edge 18 thereof is inwardly inclined and preferably rounded so as to cause the blade at its rear edge to fulcrum or contact at its top with the rear wall of its slot, thus leaving a space between this edge and said rear wall to admit of rocking the blade to effect its removal, the rocking being accomplished by slight upward and downward blows upon the projection 17. It will be noted that the retaining ring 13 is of such width as to overhang the end of the nut and project flush with the end of the projection 17 so as to provide a guard to the projection.

In order to provide an effectual lock for the retaining ring 13 there has been provided the locking washer 19 which fits the reduced portion 9 and is clamped between the nut head 8 and the ring 13. This washer is provided with a plurality of tongues 20, one or more of which are bent down into contact with the nut head while one or more are bent down in contact with the retaining ring thus effectually locking the nut and ring against movement.

What I claim is:

1. A nut lock comprising a threaded bolt, a nut therefor having one or more slots therein in open relation to the bolt opening, and having an externally threaded portion intersected by an unthreaded surface about each slot, a blade for insertion in said slots, and a threaded ring for said externally threaded portion of the nut, substantially described and for the purpose set forth.

2. A nut lock comprising a threaded bolt, a nut therefor having one or more slots therein in open relation to the bolt opening, and having an externally threaded portion intersected by an unthreaded surface about each slot, a blade for insertion in said slots, a threaded ring for said externally threaded portion of the nut, and means for locking said ring upon the nut, substantially as described and for the purpose set forth.

3. A nut lock comprising a threaded bolt, a nut therefor having an externally threaded reduced portion intersected by one or more unthreaded surfaces, and having slots extending from said surfaces to the bolt opening, a blade for said slots, a threaded ring for said reduced portion, and an inter-locking washer disposed between said nut and ring, substantially as described and for the purpose set forth.

In testimony whereof I affix my signature, in presence of two witnesses.

JOSEPH E. ROBINSON.

Witnesses:
W. J. Lukens,
T. S. Thomas, Jr.